US007412661B2

(12) United States Patent
Sellers et al.

(10) Patent No.: US 7,412,661 B2
(45) Date of Patent: Aug. 12, 2008

(54) METHOD AND SYSTEM FOR CHANGING VISUAL STATES OF A TOOLBAR

(75) Inventors: Timothy D. Sellers, Bellevue, WA (US); Heather L. Grantham, Redmond, WA (US); Jeremy W. J. Newton-Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 560 days.

(21) Appl. No.: 11/073,190

(22) Filed: Mar. 4, 2005

(65) Prior Publication Data

US 2006/0200777 A1    Sep. 7, 2006

(51) Int. Cl.
*G06F 3/00* (2006.01)
*G06F 3/14* (2006.01)

(52) U.S. Cl. .................. 715/779; 715/744; 715/765; 715/804; 715/781

(58) Field of Classification Search ............. 715/744, 715/762, 764, 765, 779, 781, 810, 821, 856, 715/862
See application file for complete search history.

(56) References Cited

U.S. PATENT DOCUMENTS

| | | | |
|---|---|---|---|
| 6,512,529 B1 * | 1/2003 | Janssen et al. | 715/790 |
| 6,587,117 B1 * | 7/2003 | Wright et al. | 345/601 |
| 6,727,919 B1 * | 4/2004 | Reder et al. | 715/810 |
| 7,293,241 B1 * | 11/2007 | Tornqvist et al. | 715/767 |
| 2003/0035012 A1 * | 2/2003 | Kurtenbach et al. | 345/810 |
| 2003/0063126 A1 * | 4/2003 | Yanchar et al. | 345/781 |
| 2003/0142138 A1 * | 7/2003 | Brown et al. | 345/797 |
| 2004/0100486 A1 * | 5/2004 | Flamini et al. | 345/723 |
| 2004/0135824 A1 * | 7/2004 | Fitzmaurice | 345/856 |
| 2006/0059437 A1 * | 3/2006 | Conklin, III | 715/800 |
| 2007/0089006 A1 * | 4/2007 | Chaudhri et al. | 715/768 |

* cited by examiner

*Primary Examiner*—X. L Bautista
(74) *Attorney, Agent, or Firm*—Workman Nydegger

(57) ABSTRACT

A method and system for changing the area in which to view the content of a document while maintaining access to various viewing options. In a first state, toolbar items are displayed in a toolbar area while a document is displayed in a document area. In changing to a second viewing state, certain items of the toolbar area are hidden while a menu toolbar item remains displayed. In addition, the document area is expanded to include the now-minimized toolbar area. The menu toolbar item may become semi-transparent during the second viewing state, provides access to viewing options, and also allows the viewing state to be changed back to the first viewing state.

19 Claims, 6 Drawing Sheets

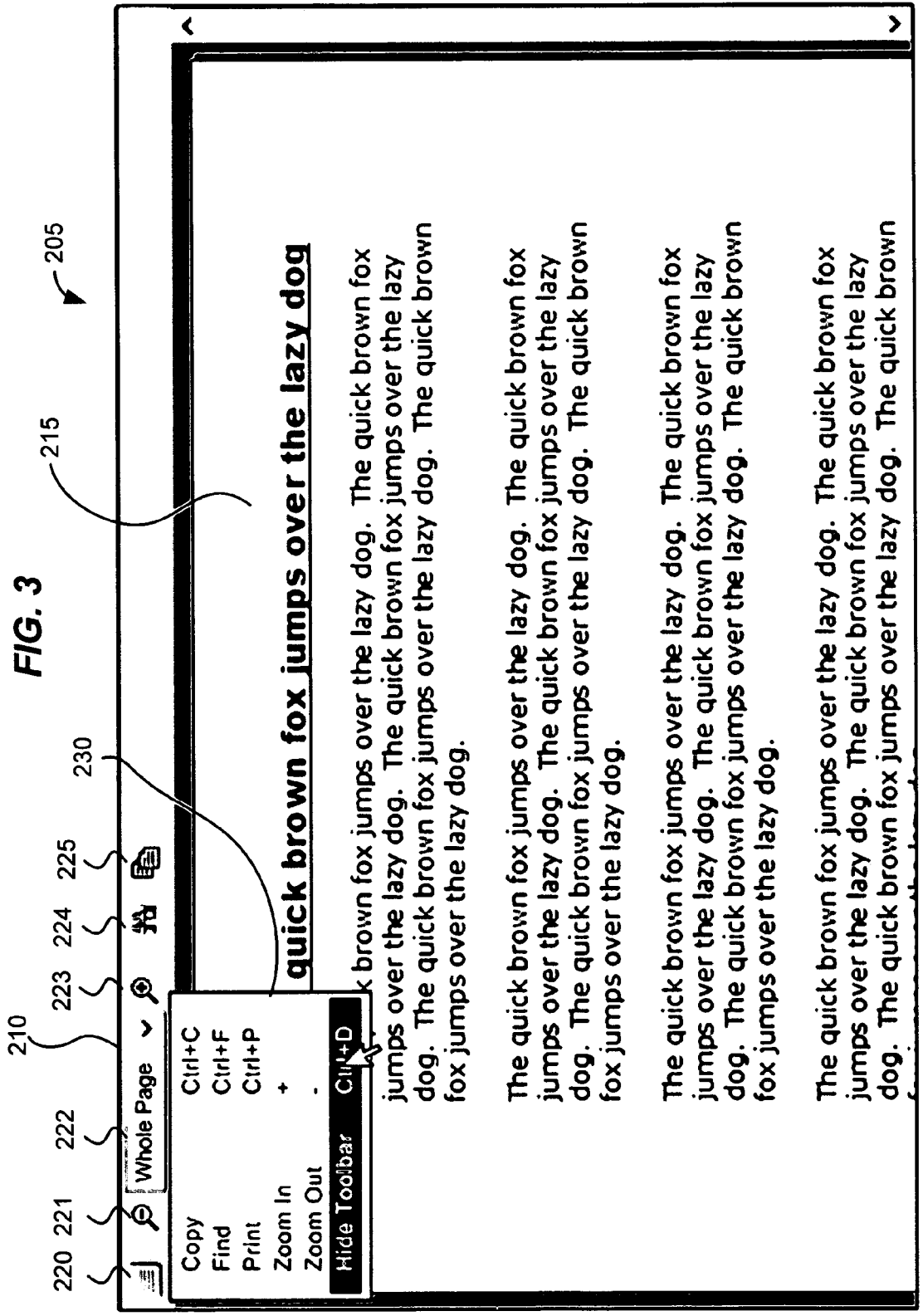

FIG. 4

The quick brown fox jumps over the lazy dog — 215

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog.

220

METHOD AND SYSTEM FOR CHANGING VISUAL STATES OF A TOOLBAR

FIELD OF THE INVENTION

The invention relates generally to computers, and more particularly to displaying information.

BACKGROUND

Computer displays are quickly becoming a viable viewing source for many types of activities. One such activity is the viewing of documents. A computer can allow great flexibility in viewing a document including jumping to hyperlinked locations in the document, zooming in and out, allowing a user to jump to a page by indicating a desired page number, and a host of other document viewing options. Although computer displays are getting larger, more viewable, and more affordable, there is still only a finite amount of area with which to display the content of a document and toolbars or menu items that provide options for viewing the document.

What is needed is a method and system for changing the amount of area in which to view content of a document while maintaining access to various viewing options.

SUMMARY

Briefly, the present invention provides a method and system for changing the area in which to view the content of a document while maintaining access to various viewing options. In a first state, toolbar items are displayed in a toolbar area while a document is displayed in a document area. In changing to a second viewing state, certain items of the toolbar area are hidden while a menu toolbar item remains displayed. In addition, the document area is expanded to include the now-minimized toolbar area. The menu toolbar item may become semi-transparent during the second viewing state, provides access to viewing options, and also allows the viewing state to be changed back to the first viewing state.

Other aspects will become apparent from the following detailed description when taken in conjunction with the drawings, in which:

BRIEF DESCRIPTION OF THE DRAWINGS

FIG. 3 is a screen shot illustrating one exemplary view of a document viewing control in operation in accordance with various aspects of the invention;

FIG. 4 is a screen shot illustrating another exemplary view of a document viewing control in operation in accordance with various aspects of the invention;

DETAILED DESCRIPTION

Exemplary Operating Environment

Figure 1:
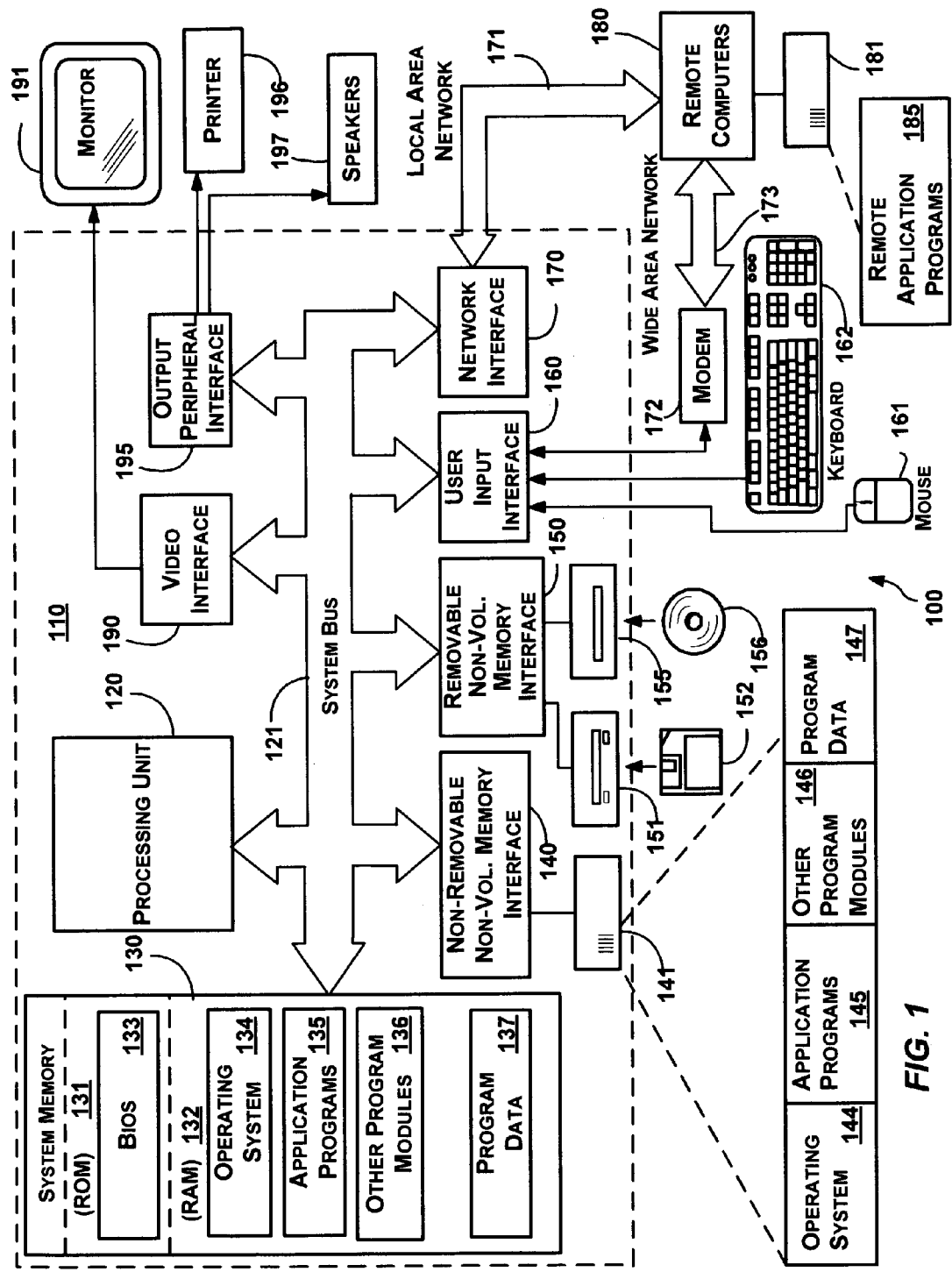
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Changing Visual States of a Toolbar

Figure 2:
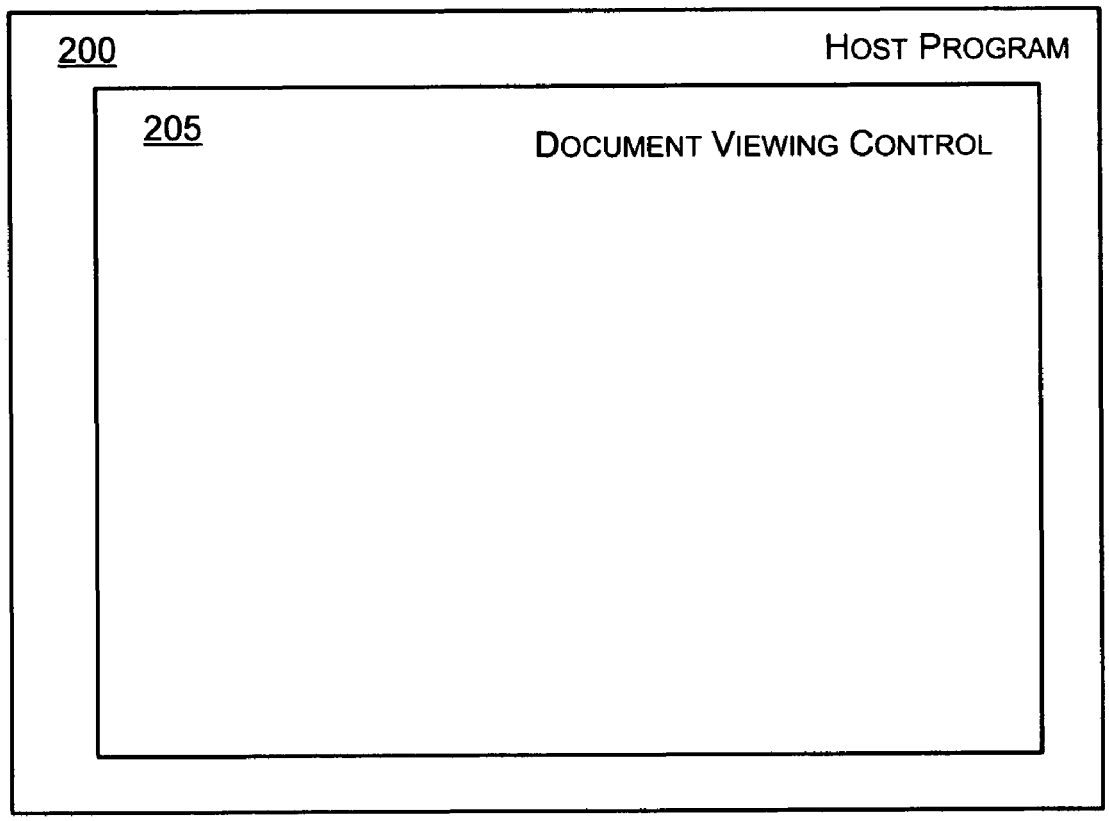
FIG. 2 is a block diagram representing an exemplary configuration in which the present invention may operate in accordance with various aspects of the invention.

FIG. 2 is a block diagram representing an exemplary configuration in which the present invention may operate in accordance with various aspects of the invention. The configuration includes a host (e.g., application) program 200 and a document viewing control 205. The host program 200 comprises a computer program that executes on a computer, such as the computer system 120 of FIG. 1, and may comprise a conventional application program, an operating system component or utility, another control, and so forth.

The document viewing control 205 comprises an object that may include other objects (e.g., controls) to perform certain functionality. When executed, the document viewing control provides a viewing area with which to view documents and may also display one or more toolbar items for accessing and modifying the way the document is viewed. For example, a user may zoom in and out by clicking on the appropriate toolbar item, may select a desired zoom percentage from a dropdown list or directly type in a desired zoom percentage value, and may find, copy, or print text in the document by selecting the appropriate toolbar item. As used herein, a document may include text, graphics, or any combination thereof.

The document viewing control may expose several properties and commands. Below is a definition of some exemplary properties and commands that may be exposed by the document viewing control 205.

```
namespace System.Windows.Controls
{
   public class DocumentViewer : Control, IServiceProvider,
IAutomationPatternProvider, IAddChild, IEnsureVisible
   {
     //Public Properties
     //Page layout & display controls
     public int                          PageCount { get; }
     public int                          FirstVisiblePage { get; set; }
     public int                          LastVisiblePage { get; }
     public double                       HorizontalOffset { get; set; }
     public double                       VerticalOffset { get; set; }
     public double                       ExtentWidth { get; }
     public double                       ExtentHeight { get; }
     public double                       ViewportWidth { get; }
     public double                       ViewportHeight { get; }
     public bool                         ShowPageBorders { get; set; }
     public DocumentLayout               DocumentLayout { get; set; }
     public double                       ZoomPercentage { get; set; }
     public int                          GridColumnCount { get; set; }
     public double                       VerticalPageSpacing { get; set; }
     public double                       HorizontalPageSpacing { get; set; }
     //The document content
     public IDocumentPaginator           Content { get; set; }
     //Useful flags (for Styling purposes)
     public bool                         IsAtStart { get; }
     public bool                         IsAtEnd { get; }
     public bool                         CanZoomIn { get; }
     public bool                         CanZoomOut { get; }
     public bool                         IsToolbarMaximized { get; set; }
     //Attached Dependency Property for Styling requirements
     public DependencyProperty           ContentHostProperty;
//Public Commands exposed by DocumentViewer (i.e. not in CommandLibrary)
     //Toolbar
     public Command                      ToggleToolbar;
     //Layout related
     public Command                      ReflowDocument;
     public Command                      ViewThumbnails;
     public Command                      ViewFitToWidth;
     public Command                      ViewFitToHeight;
   }
}
namespace System.Windows.Documents
{
    //Document Layout specification
    public struct DocumentLayout
    {
       //Constructor assuming Value = 1.0 and Text=""
       public DocumentLayout(DocumentLayoutType type);
       //Constructor assuming Default Text="".
       public DocumentLayout(DocumentLayoutType type, double value);
       //Constructor assuming nothing.
       public DocumentLayout(DocumentLayoutType type, double value,
string text);
       public DocumentLayoutType DocumentLayoutType { get; set; }
       public double Value { get; set; }
       public string Text { get; set; }
    }
    public enum DocumentLayoutType
    {
      Zoom,
      FitToWidth,
      FitToHeight,
      ThumbnailView,
      GridColumnCount
    }
}
```

The properties and commands of the document viewing control 205 may be accessed by the application 200. Properties that indicate "get" are readable. Properties that indicate "set" are writable. Properties that indicate "get" and "set" are both readable and writable. It will be readily recognized that other properties and commands may be included and/or that some of the properties and commands above may be deleted or modified without departing from the spirit or scope of the present invention. Furthermore, the above-described properties and commands are exemplary, and it will be readily recognized that other data structures, definitions, techniques, and methods may be used to implement various aspects of the document viewing control 205 without departing from the spirit or scope of the present invention.

FIG. 3 is a screen shot illustrating one exemplary view of a document viewing control in operation in accordance with various aspects of the invention. In this view, the document viewing control 205 comprises a toolbar 210 and a viewing area 215. The toolbar 210 may include one or more toolbar items 220-225. Exemplary toolbar items include menu button 220, zoom in button 221, zoom combobox 222, zoom out button 223, find button 224, copy button 225, and print button (not shown). The document viewing control 205 may provide an interface that allows additional toolbar items to be added and that allows any existing or added toolbar items to be removed, hidden, enabled, or disabled.

The document viewing control 205 may come with a standard set of toolbar items and functionality for displaying a document in the viewing area based thereon. This set of toolbar items and functionality for displaying a document may be selected at development time, for example. Ideally, the document viewing control 205 includes all the functionality for displaying a document based on selections to the toolbar items. For example, if the zoom out button 223 is selected, the document viewing control 205 may zoom the document in the view area 215 as appropriate without additional instruction by the application hosting the document viewing control 205.

The document viewing control 205 may display a menu 230 when the menu button 220 is selected. The menu 230 may include menu items that provide access to the same functionality as the toolbar items 221-225. In addition, the menu 230 may include a menu item that allows the document viewing control 205 to hide all toolbar items except the menu button 220 and to turn the menu button 220 semi-transparent.

Performing these actions may be done to increase the area provided in the viewing area as shown in FIG. 4, which is a screen shot illustrating another exemplary view of a document viewing control in operation in accordance with various aspects of the invention. In this view, the menu button 220 is semi-transparent while the viewing area 215 has increased by taking the space previously occupied by the toolbar 210.

Figure 5:
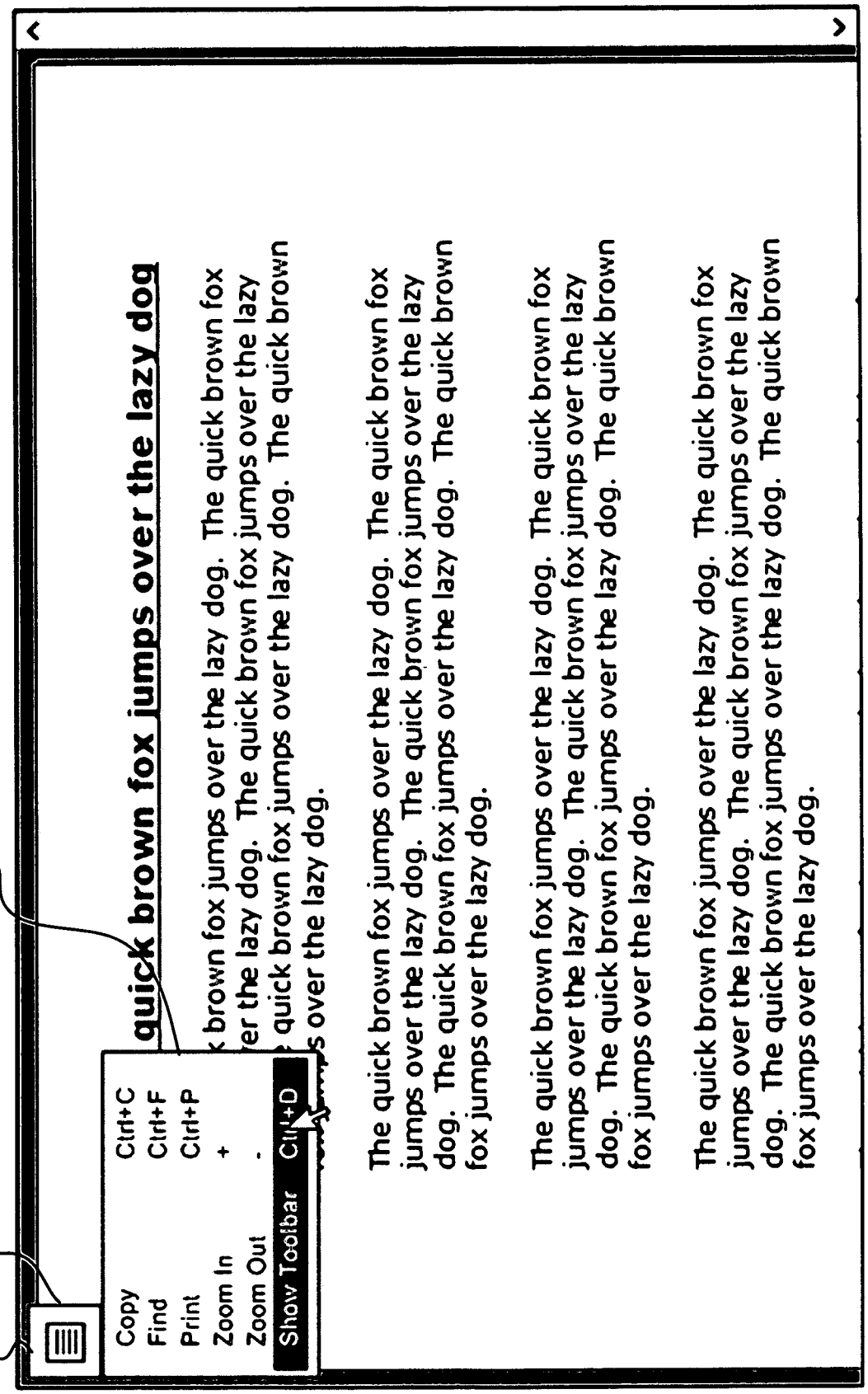
FIG. 5 is a screen shot illustrating another exemplary view of a document viewing control in operation in accordance with various aspects of the invention.

Hovering a pointer (e.g., via a mouse) near the menu button 220 may cause the menu button 220 to become opaque as shown in FIG. 5, which is a screen shot illustrating another exemplary view of a document viewing control in operation in accordance with various aspects of the invention. The menu button 220 may have an area 505 defined around it. If the pointer is hovered within the area 505, the menu button 220 may become opaque. In one embodiment, instead of instantly becoming opaque when a pointer is hovered over the area 505, the menu button 220 becomes increasingly opaque over a period of time as the pointer remains hovering over the area 505 until all or a portion of the menu button 220 is totally opaque.

To cause the toolbar items 221-225 to be displayed again, a user may hover the pointer over the area 505 and select the menu button 220 (by selecting anywhere within the area 505). Selecting the menu button 220 causes the menu 510 to be displayed. The user may then select the show toolbar menu item which then causes the document viewing control 205 to display as shown in FIG. 3.

Figure 6:
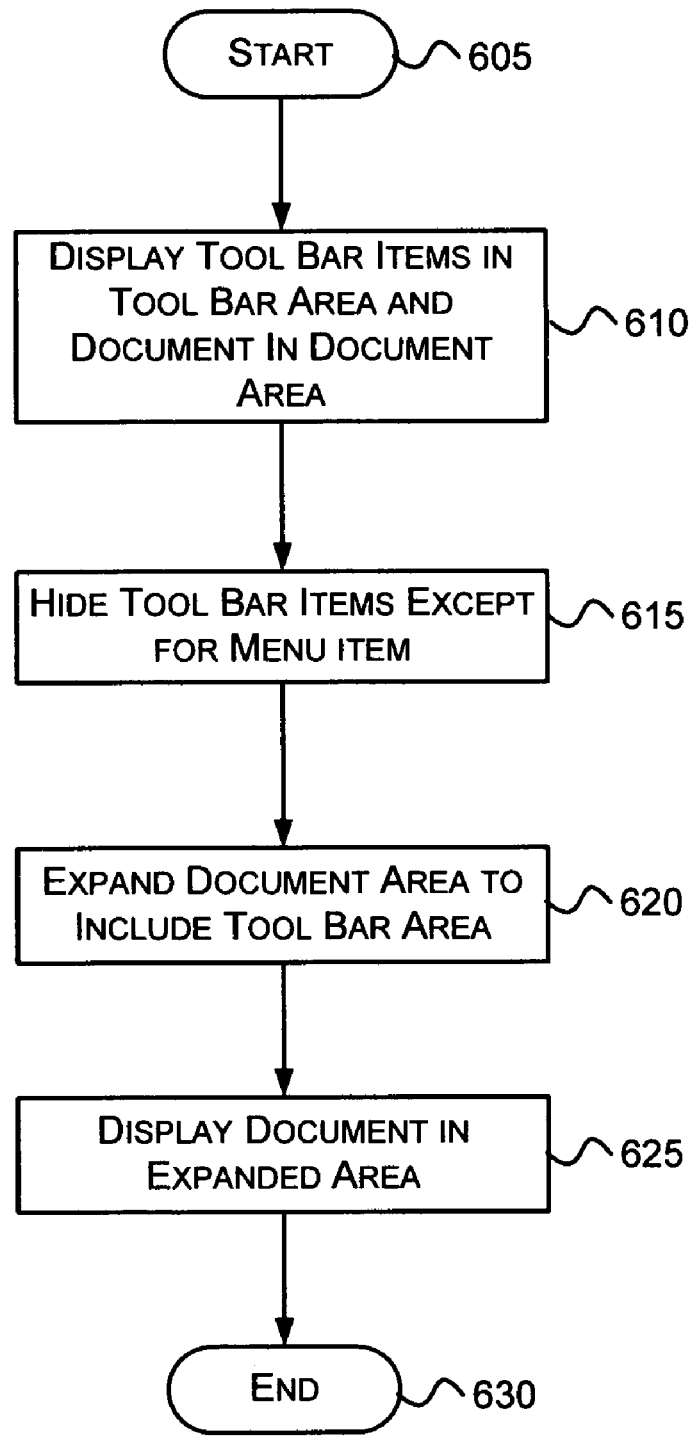
FIG. 6 is a flow diagram generally representing exemplary actions that may occur in changing from one viewing state to another in accordance with various aspects of the invention

FIG. 6 is a flow diagram generally representing exemplary actions that may occur in changing from one viewing state to another in accordance with various aspects of the invention. At block 605, the actions begin.

At block 610, the toolbar items are displayed in a toolbar area, while the document is displayed in the document area of the document viewing control. At block 615, a state change is signaled and the toolbar items (except for the menu item) are hidden. The menu item may become semi-transparent during this block. At block 620, the document area is expanded to include the toolbar area. At block 625, the document is displayed in the expanded area. At block 630, the actions end. The actions may be reversed when another viewing state change occurs. In addition, it will be readily recognized that the order of the actions may vary without departing from the spirit or scope of the present invention.

It will be recognized that various aspects of the invention provide several advantages, including providing two states for the toolbar of a document viewing control. In the first state, standard or modified toolbar items are displayed in a toolbar to give easy access to the various toolbar items while viewing a document. The toolbar includes a menu button that when selected displays a menu including a menu item for changing the state of the document viewing control to a second state. In the second state, the toolbar items are hidden except for a semi-transparent menu button. Hiding the toolbar items allows for more screen area to be devoted to viewing a document while still allowing the functionality of the toolbar items to be accessed through the semi-transparent menu button. A menu item in a menu accessible through the semi-transparent menu button allows the user to switch back to the first state.

As can be seen from the foregoing detailed description, there is provided a method and system for changing the area in which to view the content of a document while maintaining access to various viewing options. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage media storing computer-executable instructions, comprising instructions for:
   displaying toolbar items in a toolbar area and a document in a document area, the toolbar area and the document area being non-overlapping and the toolbar items including a menu item and one or more other items;
   hiding the one or more other items displayed in the toolbar area in response to a first state change associated with the toolbar; and
   in response to hiding the one or more other items, causing the document area to overlap the toolbar area such that the document area expanded to include the entirety of the toolbar area and displaying the document therein.

2. The computer-readable storage media of claim 1, further comprising instructions for causing the menu item to become semi-transparent and to continue to display in the location where it displayed in the toolbar area before the first state change.

3. The computer-readable storage media of claim 2, further comprising instructions for causing the menu item to become opaque when a pointer is hovered near the menu item.

4. The computer-readable storage media of claim 3, wherein near the menu item comprises area occupied by the menu item and a blank area surrounding the menu item.

5. The computer-readable storage media of claim 4, further comprising instruction for displaying a menu in response to selecting the menu item or the blank area, the menu including items that correspond to the one or more other items that are currently hidden.

6. The computer-readable storage media of claim 1, wherein the menu item comprises a button having an image thereon.

7. The computer-readable storage media of claim 1, further comprising instructions for reducing the document area, returning the menu area and the document area to a non-overlapping state, and displaying the one or more other items in response to a second state change.

8. The computer-readable storage media of claim 7, further comprising instructions for causing at least a portion of the menu item to become opaque in response to the second state change.

9. The computer-readable storage media of claim 1, wherein selecting the menu item causes a menu to display, the menu including an option that when selected causes the first state change.

10. A method for viewing a document, comprising:
providing a document viewing control that includes a first and second state, wherein in the first state, toolbar items are displayed in a toolbar area and the document is displayed in a document area, wherein the toolbar area and the document area are non-overlapping, and wherein in the second state the document area is expanded to include the toolbar area, a semi-transparent toolbar item is displayed in the toolbar area and the document is displayed in an area comprising the expanded document area; and
accessing the document viewing control from an application to cause the document viewing control to change between the first and second states.

11. The method of claim 10, wherein the document viewing control comprises properties and commands, wherein the properties provide access to data regarding the document viewing control, and wherein the commands cause the document viewing control to perform actions.

12. The method of claim 10, wherein the document viewing control contains all necessary logic to reformat and redisplay the document based on selections of the toolbar items.

13. The method of claim 10, wherein the document viewing control is constructed with a standard set of toolbar items which are potentially modified by the application.

14. The method of claim 13, further comprising adding toolbar items to the document viewing control by the application.

15. The method of claim 10, wherein the semi-transparent toolbar item is the only toolbar item that is displayed when the document viewing control is in the second state.

16. An apparatus for viewing a document, comprising:
a document viewing component including a first and second state, wherein the document viewing component is arranged to display a first set of toolbar items in the first state and to display a second set of toolbar items in the second state, wherein the document viewing component is further arranged to display the document in a first area in the first state and a second area in the second state, wherein the first area does not include area occupied by the first set of toolbar items, and wherein the second area does include area occupied by the first and second set of toolbar items; and
an application component arranged to interact with the document viewing component to change between the first and second states.

17. The apparatus of claim 16, wherein the second set of toolbar items includes a menu item, and wherein displaying the second set of toolbar items in the second state comprises displaying the menu item semi-transparently.

18. The apparatus of claim 17, wherein the first set of toolbar items includes the menu item and other items, and wherein displaying the first set of toolbar items comprises displaying the first set of toolbar items in a toolbar area.

19. The apparatus of claim 18, wherein the toolbar area is above, below, or at a side of the document.

* * * * *

UNITED STATES PATENT AND TRADEMARK OFFICE
CERTIFICATE OF CORRECTION

| | | |
|---|---|---|
| PATENT NO. | : 7,412,661 B2 | Page 1 of 1 |
| APPLICATION NO. | : 11/073190 | |
| DATED | : August 12, 2008 | |
| INVENTOR(S) | : Timothy D. Sellers et al. | |

It is certified that error appears in the above-identified patent and that said Letters Patent is hereby corrected as shown below:

In column 8, line 47, in Claim 1, delete "area" and insert -- area is --, therefor.

Signed and Sealed this

Third Day of May, 2011

David J. Kappos
*Director of the United States Patent and Trademark Office*